United States Patent
Stefanik et al.

(10) Patent No.: US 7,260,646 B1
(45) Date of Patent: Aug. 21, 2007

(54) METHOD OF SOFTWARE DISTRIBUTION AMONG HAND HELD COMPUTERS VIA FILE SHARING WITH LINK REFERENCES TO A WEB SITE FOR COMPLETE SOFTWARE VERSIONS

(75) Inventors: Steve Stefanik, San Jose, CA (US); Maurice Sharp, Cupertino, CA (US); Jorand C. Bratko, San Jose, CA (US); Gabriel Acosta-Mikulasek, Mountain View, CA (US)

(73) Assignee: Palmsource, Inc., Sunnyvale, CA (US)

( * ) Notice: Subject to any disclaimer, the term of this patent is extended or adjusted under 35 U.S.C. 154(b) by 625 days.

(21) Appl. No.: 10/133,016

(22) Filed: Apr. 26, 2002

Related U.S. Application Data (63) Continuation-in-part of application No. 10/058,173, filed on Jan. 25, 2002.

(51) Int. Cl.
*G06F 13/00* (2006.01)
(52) U.S. Cl. .................................... 709/238
(58) Field of Classification Search ............... 709/217, 709/227, 204; 707/200
See application file for complete search history.

(56) References Cited

U.S. PATENT DOCUMENTS

| | | | |
|---|---|---|---|
| 6,704,714 B1 * | 3/2004 | O'Leary et al. ............ 705/39 |
| 6,760,795 B2 * | 7/2004 | Goudie et al. ............ 710/56 |
| 6,782,414 B1 * | 8/2004 | Xue et al. ............ 709/206 |
| 6,832,242 B2 * | 12/2004 | Keskar ............ 709/204 |
| 6,871,047 B2 * | 3/2005 | Iwata ............ 455/41.2 |
| 2002/0052885 A1 * | 5/2002 | Levy ............ 707/200 |
| 2002/0073070 A1 * | 6/2002 | Morita et al. ............ 707/1 |
| 2002/0078360 A1 * | 6/2002 | Black ............ 713/176 |
| 2003/0110266 A1 * | 6/2003 | Rollins et al. ............ 709/227 |

OTHER PUBLICATIONS

James F. Kurose, 2001, Addison Wesley, Computer Networking (A top-down approach featuring the internet), P409-410.*

* cited by examiner

*Primary Examiner*—Robert B. Harrell
(74) *Attorney, Agent, or Firm*—Berry & Associates P.C.

(57) ABSTRACT

A system and method of identifying a source of a software distribution between portable computer systems. A user of a first hand held computer may transfer software, for example operating system extensions, application programs and data sets etc. to a second hand held computer. This transfer may occur wirelessly. An identification token which may identify the source of the software distribution may also be transferred, and further transferred from the second hand held computer to an "e commerce" web site in an automatic manner. In this novel manner, the sources of software distribution of respective files among many hand held computer users, may be identified to the website. This may result in wider distribution of both information about available software and the software itself, and a multi-order multiplication of economic effects in the hand held industry, while overcoming many deficiencies in the prior art of software distribution for hand held computers.

32 Claims, 8 Drawing Sheets

METHOD OF SOFTWARE DISTRIBUTION AMONG HAND HELD COMPUTERS VIA FILE SHARING WITH LINK REFERENCES TO A WEB SITE FOR COMPLETE SOFTWARE VERSIONS

RELATED APPLICATION

This application is a Continuation-in-Part of co-pending commonly-owned U.S. patent application Ser. No. 10/058,173 filed Jan. 25, 2002, entitled "Method of Software Distribution Between Portable Computer Systems" to Stefanik and Bratko.

FIELD OF THE INVENTION

Embodiments of the present invention relate to hand held computer systems. More particularly, embodiments of the present invention provide a method and apparatus for distributing software used on hand held computer systems.

BACKGROUND ART

The success of the hand held computer has resulted in an explosion of available software programs for use on hand held computers. For example, Palm, Inc. reports that over 11,000 commercial software applications are available for use on hand held computer systems running the Palm operating system. These applications are available from a large number of different sources.

Unfortunately, finding a particular application program to fit one's needs can be an arduous process. Typically, a user may access, via a web browser on a desktop computer, a website devoted to hand held application software. A search engine with access to information on some of the 11,000 application titles may help a user to narrow the available choices based on various criteria. If the user discovers an interesting application, he or she may select to preview a trial or demonstration version of the program. However, using this software distribution channel has drawbacks. Firstly, it is difficult to locate the desired software through the vast amount of titles offered. Secondly, the download and synchronization process can be challenging to novice users and involves an intermediate desk top computer system.

Generally, the program files may be downloaded from the website to the user's desktop computer. If the user has all of the appropriate software (e.g., expansion utilities and synchronization software) installed on the desktop computer, the application program files may be scheduled to load at the next synchronization session between the desktop computer and the hand held computer.

The user generally must then synchronize the desktop computer and the hand held computer. As a part of this process, the application program files may be transferred to the hand held computer. Importantly, the synchronization process is general, and typically transfers a wide variety and vast amount of information between the two computer systems. The information transferred is not limited to the application program files, but may also include, for example, data such as address list and date book entries that have changed on either system since the last synchronization. Consequently, the synchronization session may take longer than would be required simply to transfer the application program files.

The requirement of the desktop computer system in this scenario places numerous obstacles in the path between a user wanting a function and an application program which may provide for those needs. First, the desktop computer must have the appropriate software installed and operational (e.g., web browser, synchronization software, expansion software, web connectivity). Secondly, the desktop computer must be connected to the internet. For the majority of users, this remains a relatively slow dialup connection. The speed of the connection may serve to impede a user's acceptance of this process. Additionally, downloading software from the internet and installing it onto a hand held computer is not presently an automated process. A user must manually control a number of steps to perform this task, which is a barrier to many users. Further, the shear number of applications competing for exposure makes it difficult to find the "good" ones.

Moreover, retail sale of software for hand held computers does not always apply or is not always effective because software for hand held computers tends to be a relatively low priced product. A retail market must change a high mark-up on software to cover the retail overhead. As a result, retailers usually don't have the motivation to reserve valuable shelf space for low priced software for hand held computers.

SUMMARY OF THE INVENTION

Therefore, it would be advantageous to provide a method and system for the distribution of software for hand held computers that does not require an intermediate desktop computer. A further need exists for a method that tracks a source of a software distribution. A still further need exists for a method of crediting, rewarding and encouraging users for their role in a software distribution.

Embodiments of the present invention provide for the distribution of software for hand held computers without requiring an intermediate desktop computer. Still further, embodiments of the present invention provide for tracking a source of a software distribution. Yet other embodiments of the present invention provide a method of crediting users for their role in a software distribution.

A system and method of identifying a source of a software distribution between portable computer systems are disclosed. A user of a first hand held computer may transfer software, for example, operating system extensions, application programs and data sets, to a second hand held computer. This transfer may occur wirelessly. An identification token may also be transferred. An identification token may identify the source of the software distribution. An identification token may be further transferred from the second hand held computer to an "e commerce" web site in an automatic manner while authorizing features of the software. In this novel manner, the source of a software distribution, for example "beaming" an application program from one hand held computer to another hand held computer, may be identified to a website that was not involved in the aforementioned software distribution. Further, a user, not directly involved in a web site transaction but who otherwise facilitated the transaction, may be provided an incentive to distribute software among a circle of contacts. This incentive may be a reward for initiating the transaction. This may result in wider distribution of both information about available software and the software itself, and a multi-order multiplication of economic effects in the hand held industry, while overcoming many deficiencies in the prior art of software distribution for hand held computers.

Another embodiment of the present invention provides for transferring an identification token via a memory card. An identification token may be a computer readable bit pattern, which may represent numbers, symbols or combinations thereof, which is designed to identify a source of a file transfer.

In one embodiment of the present invention, a manufacturer of a hand held computer may assign an identification token. In another embodiment of the present invention, a web site may assign an identification token.

In another embodiment of the present invention, the software transfer is accomplished via infrared light. In yet another embodiment of the present invention, the transfer takes place via Bluetooth.

According to one embodiment of the present invention, a software title may have a demonstration or trial version along with the fully functional version. In response to a request to transfer the program from the first hand held computer to the second hand held computer, the demonstration or trial version only is transferred according to the embodiment. The title does not become fully functional until payment is made to the software distributor or developer. Payment may then release a code that in turn causes the demonstration version to become fully operational.

DETAILED DESCRIPTION OF THE INVENTION

In the following detailed description of the present invention, method of identifying a source of a software distribution between portable computer systems, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 200, 500, 700, 900 and 1000) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "demarking" or "transferring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method of Identifying a Source of a Software Distribution Between Portable Computer Systems Embodiments of the present invention are described in the context of a hand held computer system. However, it is appreciated that the present invention may be utilized in other types of computer systems where it may be necessary or desirable to distribute the task of distributing application programs and/or data files.

Figure 1:
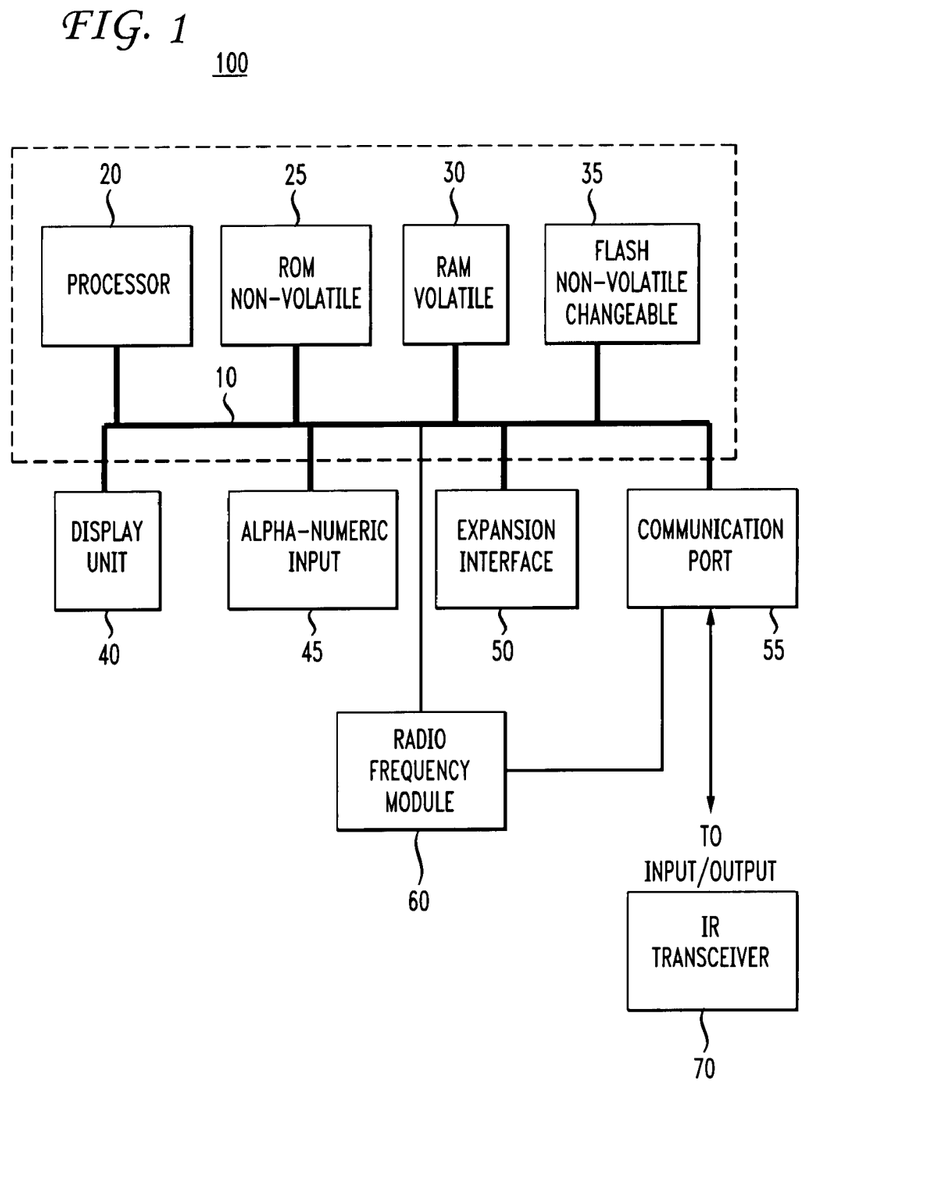
FIG. 1 is a block diagram of a computer system, which may be used as a platform to implement embodiments of the present invention.

FIG. 1 is a block diagram of a portable, e.g., hand held, computer system 100, which may be used as a platform to implement embodiments of the present invention. Computer system 100 includes an address/data bus 10 for communicating information, a central processor 20 functionally coupled with the bus for processing information and instructions, a volatile memory 30 (e.g., random access memory RAM) coupled with the bus 10 for storing information and instructions for the central processor 20 and a non-volatile memory 25 (e.g., read only memory ROM) coupled with the bus 10 for storing static information and instructions for the processor 20. Computer system 100 also optionally includes a changeable, non-volatile memory 35 (e.g., flash) for storing information and instructions for the central processor 20 which can be updated after the manufacture of system 100.

Also included in computer system 100 of FIG. 1 is an optional alphanumeric input device 45. Device 45 can communicate information and command selections to the central processor 20. Device 45 may take the form of a touch sensitive digitizer panel.

The optional display unit 40 utilized with the computer system 100 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user.

Computer system 100 also optionally includes an expansion interface 50 coupled with the bus 10. Expansion interface 50 can implement many well known standard expansion interfaces, including without limitation the Secure Digital card interface, universal serial bus (USB) interface, Compact Flash, Personal Computer (PC) Card interface, CardBus, Peripheral Component Interconnect (PCI) interface, mini-PCI interface, IEEE 1394, Small Computer System Interface (SCSI), Personal Computer Memory Card International Association (PCMCIA) interface, Industry Standard Architecture (ISA) interface, or RS-232 interface. It is appreciated that external interface 50 may also implement other well known or proprietary interfaces, such as Memory Stick interface, commercially available from Sony Corporation.

In one embodiment of the present invention, expansion interface 50 may consist of signals substantially compliant with the signals of bus 10.

A wide variety of well known expansion devices may be attached to computer system 100 via expansion interface 50. Examples of such devices include without limitation rotating magnetic memory devices, flash memory devices, digital cameras, wireless communication modules, digital audio players and Global Positioning System (GPS) devices.

System 100 also optionally includes a communication port 55. Communication port 55 may be implemented as part of expansion interface 50. When implemented as a separate interface, communication port 55 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394 and synchronous ports.

System 100 optionally includes a radio frequency module 60, which may implement a mobile telephone, a pager, or a digital data link. Radio frequency module 60 may be interfaced directly to bus 10, via communication port 55 or via expansion interface 50.

System 100 optionally includes an infrared (IR) light signaling transceiver 70. IR transceiver 70 may typically be coupled to a communication port, for example communication port 55. It is appreciated that there are other well known arrangements of IR port 70, including connection directly to bus 10. IR port 70 may serve to communicate with other computer systems over short range, line of sight paths. IR transceiver 70 may be compliant with Infrared Data Association (IrDA) standards.

Figure 2:
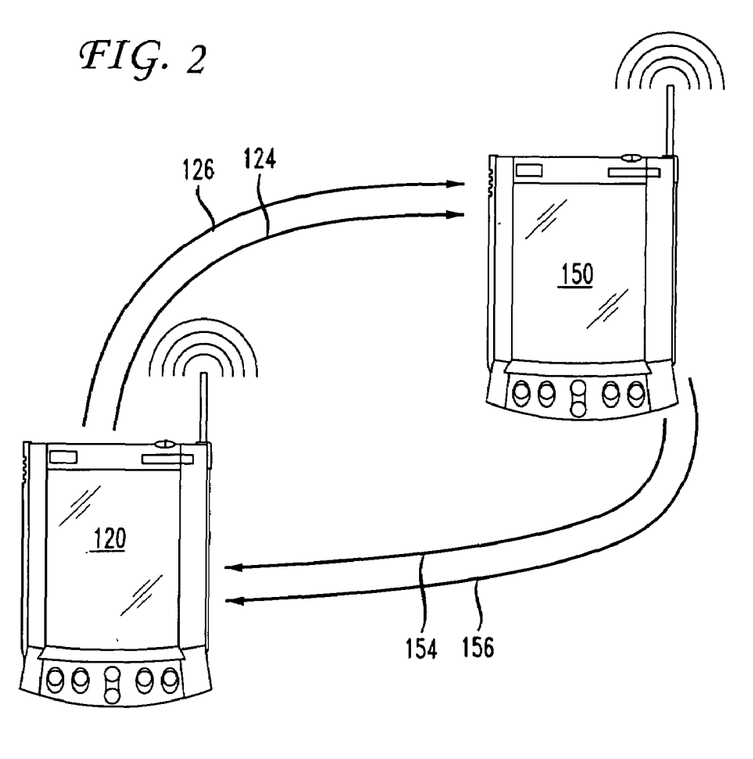
FIG. 2 illustrates a communication between a first wireless hand held computer and a second wireless hand held computer, according to an embodiment of the present invention.

FIG. 2 illustrates a communication between a first wireless hand held computer 120 and a second wireless hand held computer 150, according to an embodiment of the present invention. Both computer system 120 and 150 may be similar to hand held computer system 100. Computer system 120 and computer system 150 may be in wireless communication with each other. The wireless communication may be via radio, for example Bluetooth or IEEE 802.11, or via infrared light. It is appreciated that other forms of communication, including well known wireless and wired forms of computer communication, are well suited to embodiments of the present invention.

Wireless communication 124 is a request from computer system 120 to computer system 150 for summary information on computer files stored on computer system 150. Files for which summary information is available may be application programs, operating system extensions, data sets and other well known computer file types. Wireless communication 124 may be a general or "broadcast" message intended for any hand held computer system within communication range. Wireless communication 124 may be automatically initiated in a variety of well know manners, for example in response to a Bluetooth inquiry message from hand held computer 150, a communication request from hand held computer 150 or on a periodic or random time basis. Wireless communication 124 may also be initiated in response to a user command.

In response to wireless communication 124, hand held computer 150 may respond with wireless communication 154. Wireless communication 154 may contain summary information on computer files stored on computer system 150. Wireless communication 154 may also be initiated by a user.

Summary information contained in wireless communication 154 may include descriptive information regarding a set of files contained in device 150. This descriptive information may include rating information, computer file title, a user summary, summary and promotional information provided by the file developer, a universal resource locator, URL, for further information on the file, file size, estimated transfer time for the file and other well known information about computer files.

A user of hand held computer 120 may review such summary information and select a subset of files listed as available on hand held computer 150 for transfer to hand held computer 120. Wireless communication 126, from hand held computer 120 to hand held computer 150, may be a request for a list of files to be transferred from hand held computer 150 to hand held computer 120.

Wireless communication 156, from hand held computer 150 to hand held computer 120, may be a transfer of requested computer files from hand held computer 150 to hand held computer 120. Wireless communication 156 may be initiated automatically in response to the receiving of wireless communication 126. Wireless communication 156 may include demonstration or trial versions of application programs.

Figure 3:
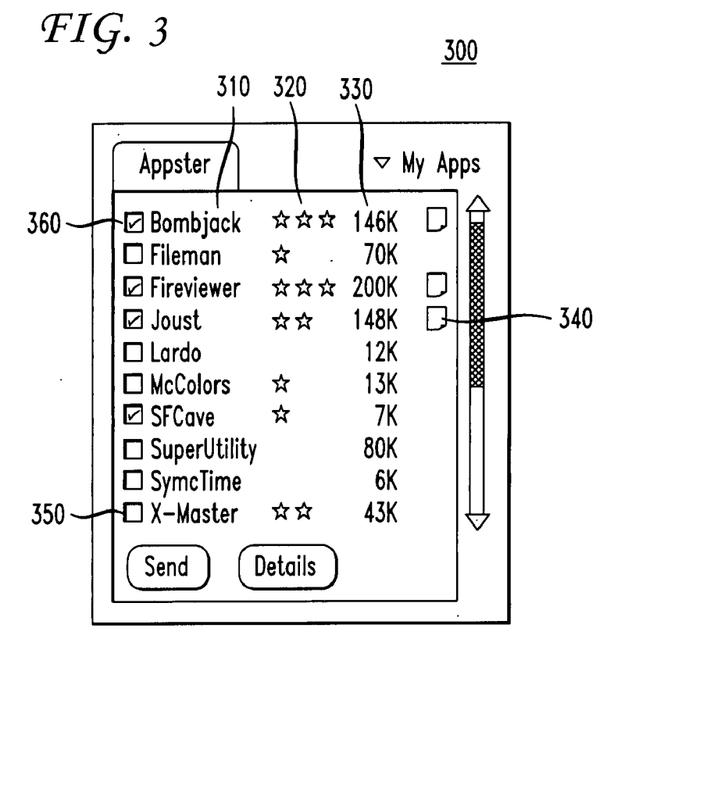
FIG. 3 illustrates a display screen as may be used by a user of a hand held computer system to demark files, according to an embodiment of the present invention.

FIG. 3 illustrates a display screen 300 as may be used by a user of a hand held computer system, for example display unit 40 of hand held computer system 100, to demark computer files. Demarking a computer file allows the demarked file to be included in the software distribution mechanisms of the present invention. Unmarked files may remain private, and are not eligible to be transferred via the process shown in FIG. 2.

Display element 310 of FIG. 3 may list available files, including application programs, operating system extensions and data set files, that are available on a first hand held computer. In the example of display image 300, the files are listed in a vertical column, including "BombJack," "Fileman," and "X-Master."

Display element 320 may be a rating assigned to a corresponding file. For example, "BombJack" is depicted as having a rating of three stars. Rating may originate from users, developers, etc.

Display element 330 may be the storage or memory requirements or "size" of the corresponding file. For example, "BombJack" is listed as requiring "146K." A typical unit of size may be bytes, or "K" (i.e. kilobytes=1024 bytes).

Display element 340 may be an icon to indicate that there is additional information available for the corresponding file. For example, "Joust" is shown as having additional information available. Such additional information may include a user-generated summary of the file, e.g., "This is a really cool version of the well known game 'Bomber-Man.'" This capability allows users of a hand held computer to act as a "sales person" for a piece of software (program, dataset, etc.) A user-generated summary may be persuasive if there is already a relationship between two hand held computer users. Additional information may also include material from the originator of the file, e.g., the writer or developer of an application. Such information may include advertising material, e.g., "Plays Faster! Awe-inspiring Graphics!," and a universal resource locator, URL, of the developer's website.

Display element 350 may be a "check box" associated with each available file. A user may select, or demark, a file by touching the input device, for example alpha-numeric input device 45, substantially over one the check boxes. Check box 360 illustrates a visual feedback of displaying a "check" symbol within the box in response to such a user touch action.

Figure 4:
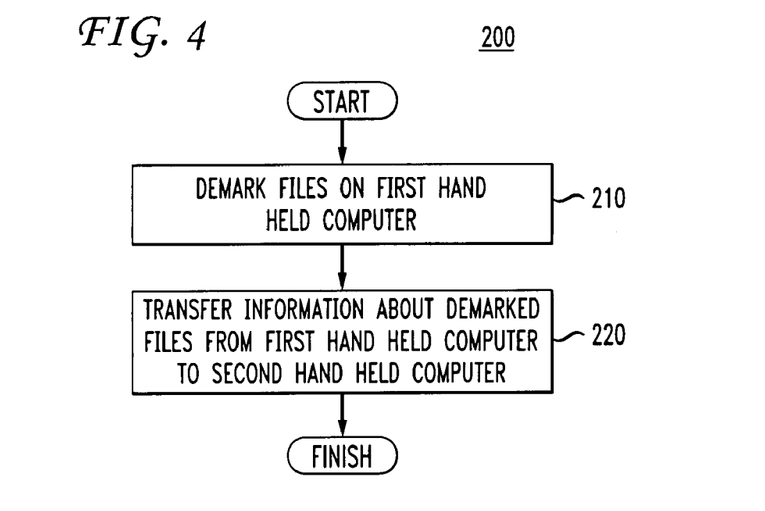
FIG. 4 illustrates a flow diagram of a method for software distribution, according to an embodiment of the present invention.

FIG. 4 illustrates a flow diagram of a method 200 for software distribution, according to an embodiment of the present invention.

In step 210, a user may demark or select files on a first hand held computer system, for example by touching check boxes 350 of FIG. 3. It is appreciated that any well known method of selecting files on hand held or other types of computer systems may be used at this step.

In step 220, information about the files selected or demarked in step 210 may be transferred to a second hand held computer system. The information transferred may include the file title, rating, file size, estimated transfer time, additional summary information such as user reviews, developer's comments and URLs. It is appreciated that transferring other types of information are also well suited to embodiments of the present invention. Importantly, the file itself is not generally transferred at this time.

According to an embodiment of the present invention, the transfer of information in step 220 may be directly from a first hand held computer to a second hand held computer. According to another embodiment of the present invention, the transfer of information in step 220 may be indirect. For example, summary information from a first hand held computer may be transferred to a third hand held computer (not shown). In step 220, summary information from, or originating with, the first hand held computer may be transferred from the third hand held computer to a second hand held computer.

The amount of information about a file transferred at step 220 is typically substantially smaller than the file itself. Consequently, it may take very much less time to transfer compared to the file itself, and storing the received information generally will not impose a burden on the receiving device.

Step 220 may be initialized by user action, either on the first hand held computer system or on the second hand held computer system. According to an embodiment of the present invention, this step may be automatically initiated when the two systems are brought into communication range according to a communication protocol. This automatic initiation is particularly well suited to Bluetooth communications, but it is to be appreciated that other well known forms of communication, including IR, IEEE 802.11 and RS-232, are well suited to embodiments of the present invention.

Figure 5A:
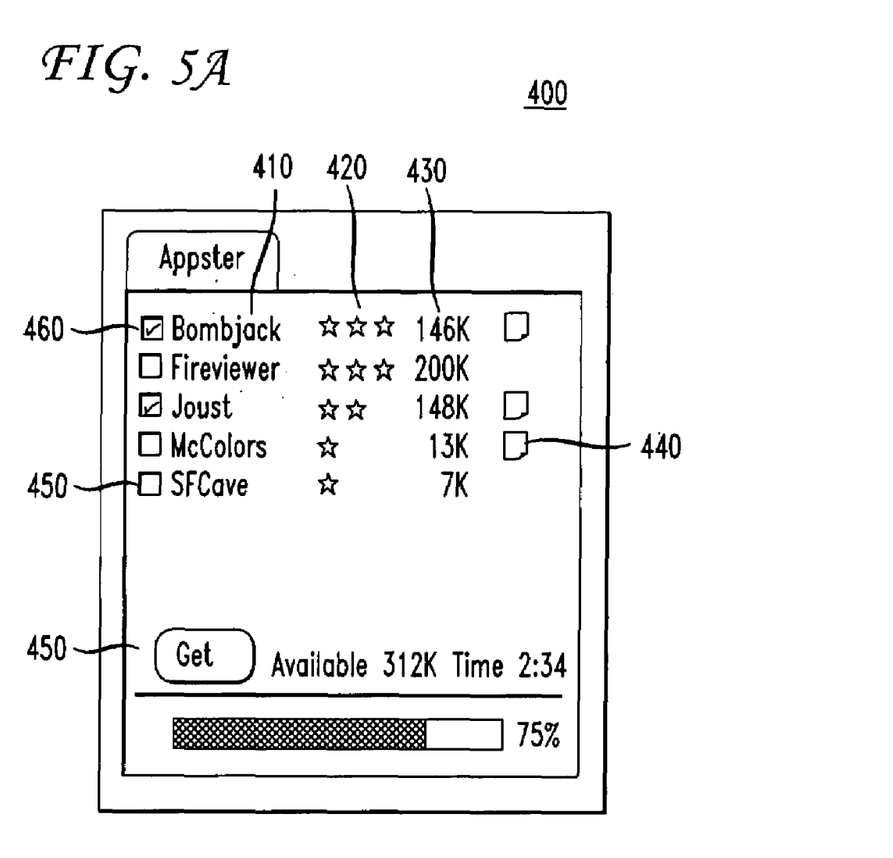
FIG. 5A illustrates a display screen as may be used by a user of a second hand held computer system for selecting files.

FIG. 5A illustrates a display screen 400 as may be used by a user of a second hand held computer system, for example display unit 40 of hand held computer system 100, for selecting files.

Display element 410 may list files, including application programs, operating system extensions and data set files, that have been selected as available by a user of a first hand held computer. Information for such a list may have been transferred to a second hand held computer as a result of process 200. In the example of display image 400, the files are listed in a vertical column, including "BombJack," "Fileman," and "SFCave." This list may generally represent the information about files transferred from a first hand held computer system.

Display element 420 may be a rating assigned to a corresponding file. For example, "BombJack" is depicted as having a rating of three stars.

Display element 430 may be the size of the corresponding file. For example, "BombJack" is listed as requiring "146K." A typical unit of size may be bytes.

Display element 440 may be an icon to indicate that there is additional information available for the corresponding file. For example, "Joust" is shown as having additional information available. Such additional information may include a user-generated summary of the file, e.g., "This is a really cool version of the well known game 'Bomber-Man.'" Additional information may also include material from the originator of the file, e.g., the writer of an application. Such information may include advertising material, e.g., "Plays Faster! Awe-Inspiring Graphics!," and a universal resource locator, URL, of the developer's website.

Figure 5B:
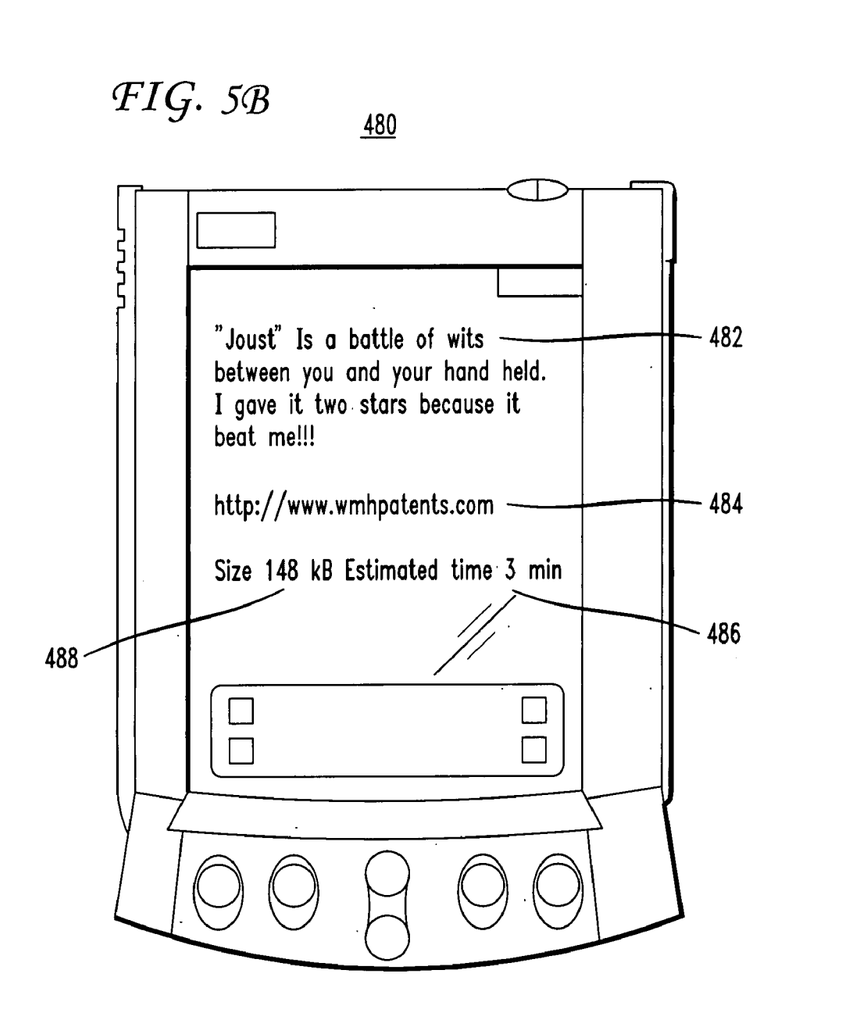
FIG. 5B illustrates a display image depicting exemplary summary information on a file, according to an embodiment of the present invention.

FIG. 5B illustrates display image 480 depicting exemplary summary information on the file "Joust," as may be displayed in response to a user selecting additional information icon 440, according to an embodiment of the present invention. Display element 482 of image 480 may be a user generated summary or recommendation of the file.

Display element 484 may be a universal resource locator, URL, of an internet web site containing more information on the file. Display element 486 may be an estimated transfer time for the particular file. Display element 488 may be the storage or memory requirements of the file.

Referring once again to FIG. 5, display element 450 may be a "check box" associated with each available file. A user may select, or demark, a file by touching the input device, for example alpha-numeric input device 45, substantially over one the check boxes. Check box 460 illustrates a visual feedback of displaying a "check" symbol within the box in response to such a user touch action.

A user of a second hand held computer system may choose, or select from this listing files to be received from the first hand held computer system. In response to selecting files, the files that are selected by the user of the second hand held computer system may be automatically transferred from the first computer system. The transfer may be initiated in response to marking the check box of each file, or the transfers may be consolidated by the user touching the "get" button 470 to complete his selection activity.

According to an embodiment of the present invention, one type of file that may be received is a demonstration, trial or limited functionality version of an application program. A "demo" version may provide limited function or a limited time of use to encourage a user to purchase the fully featured version of the application. Importantly, by transferring a demo version of an application as opposed to a fully featured version, many intellectual property rights of the application developer may be maintained.

The demo version and/or other information transferred from the first hand held computer system to the second hand held computer system may include instructions on how to purchase or upgrade to a fully functional version of the program. This frequently takes the form of a pointer to a universal resource locator, URL, of a developer's website.

Figure 6:
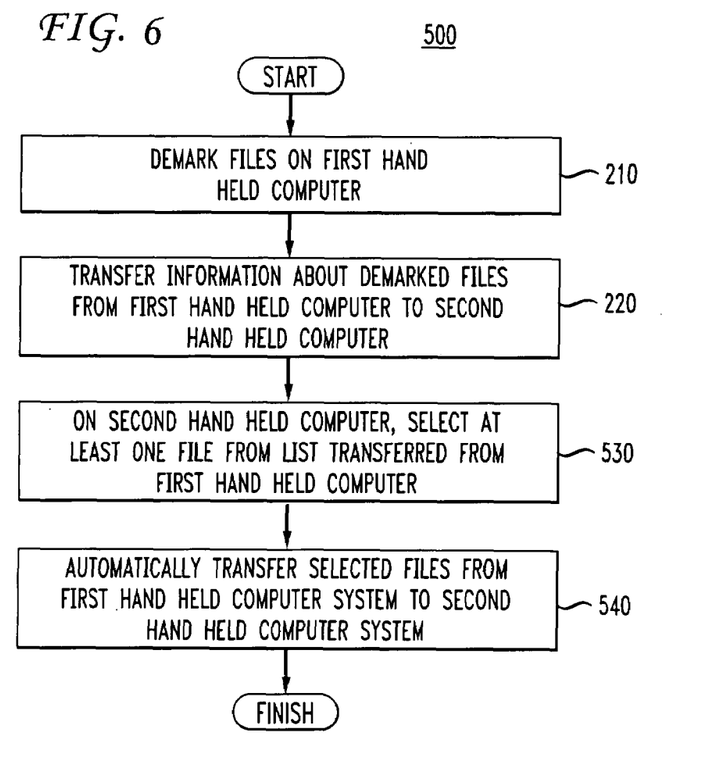
FIG. 6 illustrates a flow diagram of a method for software distribution, according to an embodiment of the present invention.

FIG. 6 illustrates a flow diagram of a method 500 for software distribution, according to an embodiment of the present invention.

In step 210, a user may demark or select files on a first hand held computer system, for example by touching check boxes 350 of FIG. 3. It is appreciated that there are other well known methods of selecting files on hand held or other types of computer systems.

In step 220, information about the files selected or demarked in step 210 may be transferred to a second hand held computer system. The information transferred may include the file title, rating, file size, estimated transfer time, additional information such as user reviews, developer's comments and URLs. It is appreciated that transferring other types of information are also well suited to embodiments of the present invention. Importantly, the file itself is not generally transferred at this time.

The amount of information about a file will typically be of substantially less size than the file itself. Consequently, it may take very much less time to transfer compared to the file itself, and storing the received information generally will not impose a burden on the receiving device.

Step 220 may be initialized by user action, either on the first hand held computer system or on the second hand held computer system. According to an embodiment of the present invention, this step may be automatically initiated when the two systems are brought into communication range. This automatic initiation is particularly well suited to Bluetooth communications, but it is to be appreciated that other well known forms of communication, including IR, IEEE 802.11 and RS-232, are well suited to embodiments of the present invention.

In step 530, a user of a second hand held computer system may select files from a list of files transferred from a first hand held computer system. Typically, although not necessarily, such a user may base a selection choice on the information transferred, such as a supplied user review. A display screen as shown in FIG. 4 may facilitate this selection. However, it is to be appreciated that other well known means of selecting items from a list are well suited to embodiments of the present invention.

In step 540, the files selected by a user of a second hand held computer (step 530, above) may be automatically transferred from a first hand held computer system to a second hand held computer system. Typically, this file transfer is made using the same communication techniques as employed in step 220, although this is not required.

As discussed above in relation to process 200, according to an embodiment of the present invention, the transfer of information in step 220 may be directly from a first hand held computer to a second hand held computer.

According to another embodiment of the present invention, the transfer of information in step 220 may be indirect. For example, summary information from, or originating with, a first hand held computer may be transferred to a third hand held computer (not shown). In step 220, summary information from the first hand held computer may be transferred from the third hand held computer to a second hand held computer.

In a similar manner, in step 540 selected files may be transferred to the second hand held computer from the third hand held computer. It is to be appreciated that the files transferred to the second hand held computer may not originate on the first hand held computer. For example, the third hand held computer may have obtained the selected files independently of the first hand held computer, for example via a website download.

In this novel manner, software, e.g., application programs, operating system extensions and data sets, may be distributed among a set of users. Prior to selection of files, a user will typically receive more pertinent information regarding such files that through prior art techniques. In addition, since the distribution of information about the files may be automated, a user will generally have greater exposure to a wider variety of file offerings, e.g., the recommended computer files of many hand held users, rather than information filtered through a limited number of websites. Further, the actual distribution is performed automatically and without the complexities of intervening desktop computer systems or the internet.

Referring once again to FIG. 2, according to another embodiment of the present invention, an identification token may accompany the file transfer from device 150 to device 120. For example, wireless communication 156 may transfer one or more requested computer files and an identification token.

An identification token may be a computer readable bit pattern, which may represent numbers, symbols or combinations thereof, which is designed to identify a source of a file transfer. Such an identification token may be assigned to a specific hand held device by the device manufacturer, as a serial number, name, identification value or the like. Identification tokens may also be assigned by a website, for example upon registering with an "e commerce" website for hand held computer software. Another exemplary website is one created by or for the developer of an application program.

An identification token may also be assigned to a particular user of a hand held device rather than the device itself.

An identification token generally may be unique among all hand held devices. Some communication protocols, for example Bluetooth, assign a device identifier to a device participating in a communication. According to an embodiment of the present invention, an identification token may be a communication device identifier or it can be independent of the communications protocol.

Figure 7:
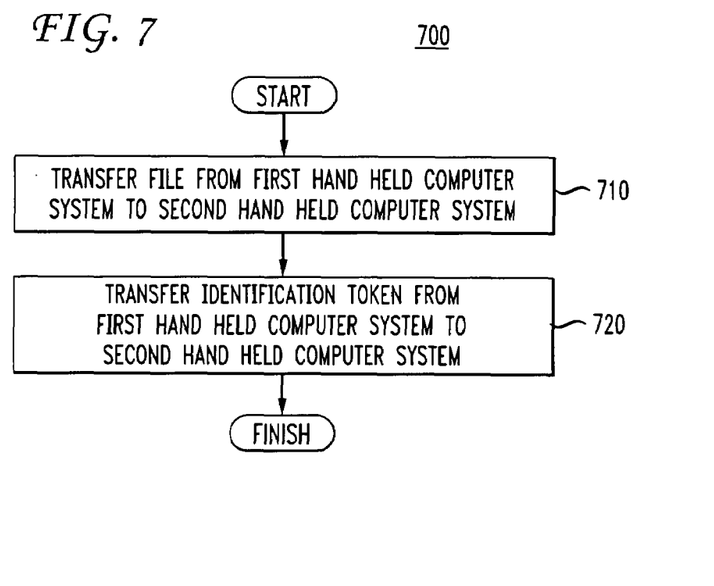
FIG. 7 illustrates a flow diagram of a method of software distribution, according to an embodiment of the present invention.

FIG. 7 illustrates a flow diagram of a method 700 of software distribution, according to an embodiment of the present invention.

In step 710, a computer file is transferred (e.g., transfer 156 of FIG. 2) from a first hand held computer system to a second hand held computer system. The transfer may be made in a variety of well known ways, including via Bluetooth wireless communications, infrared (IR) light, IEEE 802.11 and RS-232, according to embodiments of the present invention. According to another embodiment of the present invention, the file transfer may also take place via a memory card or other well known "physical" media, for example rotating magnetic media. For example, a file may be stored on a media functionally connected with a first hand held computer system and then the media may be functionally connected with a second hand held computer. With a memory card, this may typically mean moving a card from one system to another.

In step 720, an identification token is transferred from a first hand held computer system to a second hand held computer system. This transfer may generally take place in close time proximity to the file transfer of step 720, and may typically use the same communication media described above.

The receiving hand held computer may store the identification token of the sending device and associates the identification token with the received program or data. If multiple files are received from the same sending hand held computer, then the token may be associated with each file received and stored. The identification token therefore indicates the source of the received files from the stand point of the receiving hand held computer system.

Figure 8:
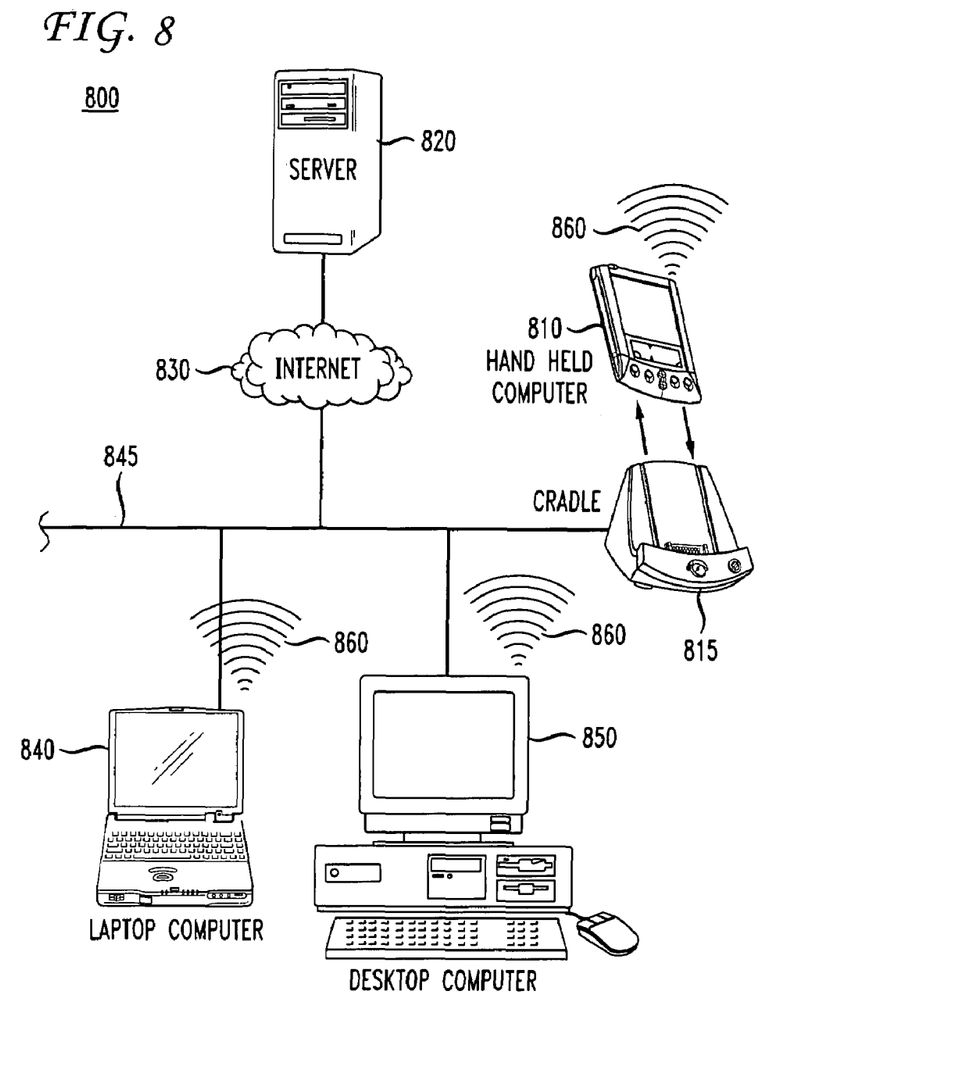
FIG. 8 illustrates an arrangement by which a hand held computer may communicate via the internet with a website, according to an embodiment of the present invention.

FIG. 8 illustrates an arrangement 800 by which a hand held computer may communicate via the internet with a website, according to an embodiment of the present invention.

Hand held computer 810, for example hand held computer 100, may be functionally connected with a cradle 815, for example via the RS-232 communications protocol via communications port 45 of FIG. 1. Cradle 815 may be functionally connected to communications bus 845. Well know communication busses, for example RS-232, ethernet and universal serial bus (USB) are well suited to embodiments of the present invention.

Desktop computer 850 or laptop computer 840 may be functionally connected to communication bus 845 via arrangements similar to those described above.

Typically, although not always, hand held computer 810 may be configured to communicate with laptop computer 840 or desktop computer 850, but not directly to the internet 830. Handheld computer 810 may lack certain software, for example network protocol stacks or device drivers, and/or physical features, for example a telephone modem, required to communication directly with the internet.

Typically, although not always, laptop computer 840 or desktop computer 850 may be connected to the internet 830 via a second communications channel (not shown). Well known communication channels for connection to the internet include ethernet, digital subscriber lines (DSL) and telephone modems.

In addition, hand held computer 860, desktop computer 850 and/or laptop computer 840 may participate in a wireless network 860, allowing for communication among desktop hand held computer 860, desktop computer 850 and/or laptop computer 840, or directly with the internet 830 though a wireless gateway (not shown). Well known wireless networks are well suited to embodiments of the present invention, including local or short range networks such as Bluetooth and IEEE 802.11, as well as wide area networks such as the Bell South Mobility Mobitext packet radio network, CDPD, CDMA and GPRS.

Arrangement 800 may allow hand held computer 810 to exchange information with website 820 via the internet. According to an embodiment of the present invention, a website may be viewed as a set of well known computer implemented services in addition to the computer hardware supporting such services.

It is to be appreciated that "pushing" information from a website to a hand held computer, for example via arrangement 800, is well suited to embodiments of the present invention. Examples of information which may be pushed include information on new applications and sales and marketing promotional material, which may encourage users to participate in embodiments of the present invention.

Figure 9:
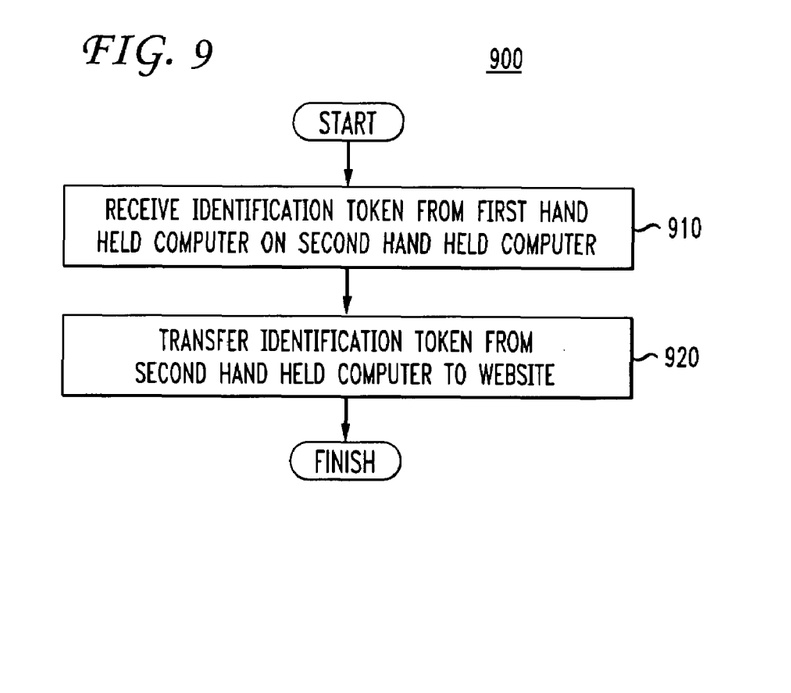
FIG. 9 illustrates a flow diagram of a process for identifying a source of a software distribution, according to an embodiment of the present invention.

FIG. 9 illustrates a flow diagram of a process 900 for identifying a source of a software distribution, according to an embodiment of the present invention.

In step 910, an identification token sent from a first hand held computer may be received by a second hand held computer. The reception may be made in a variety of well known ways, including via Bluetooth wireless communications, infrared (IR) light, IEEE 802.11 and RS-232, according to embodiments of the present invention. According to another embodiment of the present invention, the file reception may also take place via a memory card or other well known "physical" media, for example rotating magnetic media. For example, an identity token may be stored on a media functionally connected with a first hand held computer system and then the media may be functionally connected with a second hand held computer. With a memory card, this may typically mean moving a card from a first hand held computer to a second hand held computer. According to an embodiment of the present invention, step 910 may take place on a hand held computer system.

In step 920, the identification token received in step 910 may be transferred or sent from a second hand held computer to a website, for example via arrangement 800 of FIG. 8. According to an embodiment of the present invention, a hand held computer may receive the identification token and transfer that token to a website. It is to be appreciated that other types of well known computer systems are well suited to embodiments of the present invention.

According to an embodiment of the present invention, step 910 may take place in a variety of well known information transfer techniques, including wirelessly, via Bluetooth, via infrared (IR) light or via a memory card, for example PCMCIA cards or Secure Digital cards.

According to an embodiment of the present invention, a computer system manufacturer or a web site may assign an identification token, for example an "e commerce" web site used for distributing software for hand held computers. It is appreciated that other well known methods of assigning an identification token to a hand held computer system are well suited to embodiments of the present invention.

A website may use an identification token and file identification information to also gather that a first hand held computer system, associated with an identification token, sent a file to a second hand held computer system. This information may be recorded in memory of the website server.

In this novel manner, the source of a software distribution, for example "beaming" an application program from one hand held computer to another hand held computer, may be identified to a website that was not even involved in the aforementioned software distribution.

Figure 10:
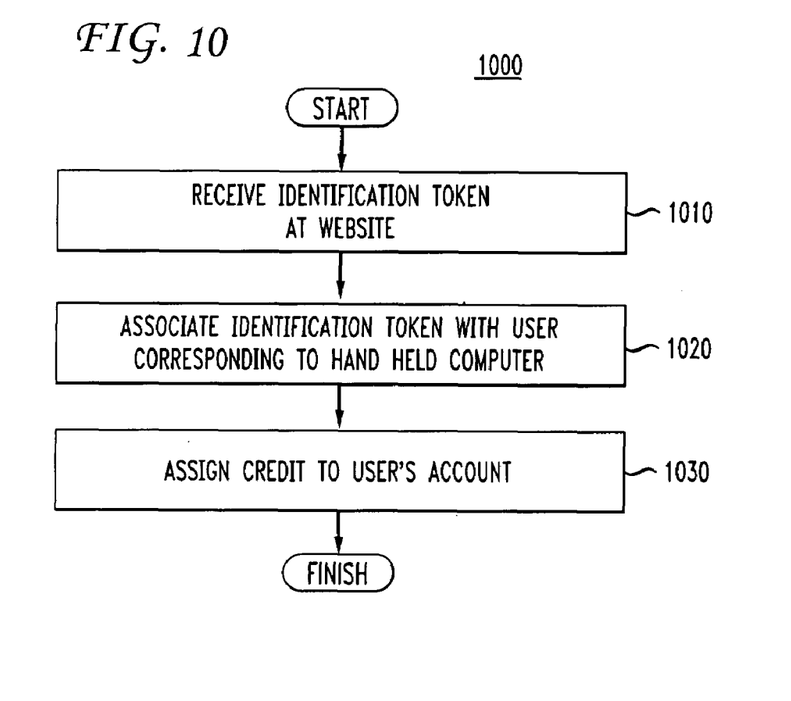
FIG. 10 illustrates a flow diagram of a method of identifying a source of a software distribution, according to an embodiment of the present invention.

FIG. 10 illustrates a flow diagram of a method 1000 of identifying a source of a software distribution, according to an embodiment of the present invention. In step 1010, an identification token may be received at a web site, for example at an "e commerce" web site for the distribution of software for hand held computers.

In step 1020, an identification token may be associated with a user corresponding to a particular hand held computer. It is appreciated that a variety of well known methods of associating a user with an identification token, for example data bases and look-up tables, are well suited to embodiments of the present invention.

According to an embodiment of the present invention, a user may be registered with a website.

In optional step 1030, a credit may be assigned to a user. According to an embodiment of the present invention, the credit may, for example, be a reward for distributing a copy of a particular piece of software. Further, according to an embodiment of the present invention, a credit may be assigned to a user in response to features of a computer file being authorized or enhanced.

For example, if a first user distributed a trial version of an application program to a second user, and if the second user linked to a web site and purchased, for example, or otherwise enabled features of the application not generally available in a trial version, the first user may receive a credit for his role in the second user's transaction. It is to be appreciated that many well known types of transactions and credit arrangements are well suited to embodiments of the present invention.

Table 1 below illustrates a portion of an exemplary table in a website memory for recording and tabulating the number of times a particular device, as represented by an identification token, has transferred a particular program to a subsequent hand held computer system and that subsequent hand held computer system has connected with the website, according to an embodiment of the present invention.

TABLE 1

| Token | Program Name | Credited Transfers |
|---|---|---|
| 35A21 | Joust | 12 |
| 35A21 | Giraffe | 3 |
| 256B12 | Joust | 29 |

For example, Table 1 shows that hand held computer "35A21" has transferred the program "Joust," which may have been a demonstration version of the program, to other hand held computers a total of 12 times. According to an embodiment of the present invention, it may be necessary for the receiving hand held computer system to connect to a web site in order for the first hand held computer system, in this example "35A21" to receive credit for the transfer. Likewise, system "35A21" has also been credited with transferring the program "Giraffe" a total of three times. Also, Table 1 shows that a different hand held computer system, identified as "256B12" has been credited with transferring "Joust" 29 times.

Table 2 below illustrates a portion of an exemplary table in a website memory for recording and tabulating hand held to hand held software distributions, according to an embodiment of the present invention.

TABLE 2

| Program Name | Transfer Type | Number |
|---|---|---|
| Joust | Bluetooth | 7563 |
| Joust | IR | 32768 |
| Joust | MMC/SD | 15 |
| Joust | Total | 40346 |
| Reptoids | IR | 1 |

For example, the fifth line of Table 2 shows that the program "Joust" has been transferred a total of 40,346 times. According to an embodiment of the present invention, it may be necessary for the receiving hand held computer system to connect to a web site in order for the software distribution to be recorded on a website, for example in the form of Table 2.

Table 2 may be broken down into a listing by type of transfer, for example by Bluetooth, infrared light or by physically moving a Multi Media Card or Secure Digital card. The information in Table 2 and other well known types of information that may be collected about software distribution may be made available to software developers, web site operators and hand held computer manufactures for a variety of well known purposes, including marketing and incentive programs.

In this novel manner, the source of a software distribution, for example "beaming" an application program from one hand held computer to another hand held computer, may be identified to a website that was not even involved in the aforementioned software distribution. Further, a user, not directly involved in a web site transaction, may be provided an incentive to distribute software among a circle of contacts. This results in wider distribution of both information about available software and the software itself, and a multi-order multiplication of economic effects in the hand held industry, while overcoming many deficiencies in the prior art of software distribution for hand held computers.

The preferred embodiment of the present invention, a system and method for software distribution, is thus described. While the present invention has been described in particular embodiments, it should be appreciated that the present invention should not be construed as limited by such embodiments, but rather construed according to the below claims.

What is claimed is:

1. A method of software distribution comprising:
  a) transferring a computer file from a first hand held computer system to a second hand held computer system via a communication protocol; and
  b) transferring an identification token from said first hand held computer system to said second hand held computer system via said communication protocol, wherein said identification token is stored in said second hand held computer system and identifies said first hand held computer as the source of said computer file, and wherein said identification token is independent of said communication protocol, and wherein said identification token is associated with a software referral program to download data to said second hand held computer system, wherein said data is software selected from the group consisting of operating system extension, application program, and data sets.

2. The method as described in claim 1 wherein said transferring in a) and b) are performed wirelessly.

3. The method as described in claim 2 wherein said transferring in a) and b) are performed via Bluetooth.

4. The method as described in claim 2 wherein said transferring in a) and b) are performed via infrared light.

5. The method as described in claim 1 wherein said identification token is assigned by a website.

6. The method as described in claim 5 wherein at least a portion of said website is operated for the benefit of a developer of said computer file.

7. The method as described in claim 5 wherein said website represents more than one computer file developer.

8. The method as described in claim 1 wherein said transferring in a) and b) are performed via a memory card.

9. The method as described in claim 1 wherein said identification token is assigned by a manufacturer of said first hand held computer system.

10. A method of identifying a source of a software distribution comprising:
   a) receiving an identification token from a first hand held computer system via a communication protocol, wherein said identification token identifies said first hand held computer as the source of a computer file transferred from said first hand held computer, and wherein said identification token is independent of the communication protocol for said transferring, and wherein said identification token is associated with a software referral program to download data to said second hand held computer system, wherein said data is software selected from the group consisting of operating system extension, application program, and data sets; and
   b) transferring said identification token to a website.

11. The method as described in claim 10 wherein said receiving is performed wirelessly.

12. The method as described in claim 11 wherein said receiving is performed via Bluetooth.

13. The method as described in claim 11 wherein said receiving is performed via infrared light.

14. The method as described in claim 10 wherein said receiving takes place on a second hand held computer system.

15. The method as described in claim 10 wherein said receiving is performed via a memory card.

16. The method as described in claim 10 wherein said identification token is assigned by a manufacturer of said first hand held computer system.

17. The method as described in claim 10 wherein said identification token is assigned by a website.

18. The method as described in claim 10 wherein at least a portion of said website is operated for the benefit of a developer of said computer file.

19. The method as described in claim 10 wherein said website represents a plurality of computer file developers.

20. The method as described in claim 10 further comprising assigning a count value representing file transfers having a source from said first hand held computer system.

21. The method as described in claim 10 further comprising assigning a count value representing file transfer of a particular file having a source from said first hand held computer system.

22. A method of identifying a source of a software distribution, said method comprising:
   a) receiving, at a website, an identification token from a first hand held computer system directly, wherein said identification token identifies a second hand held computer as the source of a computer file transferred from said second hand held computer to said first hand held computer, and wherein said identification token is associated with a software referral program to download data to said second hand held computer system, wherein said data is software selected from the group consisting of operating system extension, application program, and data sets;
   b) associating said identification token with a user corresponding to said second hand held computer.

23. The method as described in claim 22 further comprising assigning a credit to an account of said user.

24. The method as described in claim 23 wherein said assigning is in response to authorizing features of said computer file for said first hand held computer.

25. The method as described in claim 22 further comprising accepting a payment from a user of said first hand held computer.

26. The method as described in claim 25 further comprising authorizing features of said computer file for said first hand held computer in response to said accepting.

27. The method as described in claim 22 wherein said user is registered with said website.

28. The method as described in claim 22 further comprising transferring said identification token to a remote website for recording thereon a transfer of said computer file between said second and said first hand held computer systems.

29. A method of software distribution comprising:
   a) transferring a computer file from a first hand held computer system to a second hand held computer system via a communication protocol; and
   b) transferring an identification token from said first hand held computer system to said second hand held computer system via said communication protocol, wherein said identification token is stored in said second hand held computer system and identifies said first hand held computer as the source of said computer file, and wherein said identification token is an element of said communication protocol, and wherein said identification token is associated with a software referral program to download data to said second hand held computer system, wherein said data is software selected from the group consisting of operating system extension, application program, and data sets.

30. The method as described in claim 29 wherein said communication protocol is Bluetooth.

31. The method as described in claim 29 wherein said identification token is a Bluetooth device address.

32. The method as described in claim 29 further comprising associating said identification token with said computer file on said second hand held computer system.

* * * * *